Inventor
Charles Wesley Hall

By Rolland S. Trott Attorney

March 17, 1931. C. W. HALL 1,797,062
ROTARY VALVE FOR ENGINES
Filed Oct. 10, 1927  3 Sheets-Sheet 2

Inventor
Charles Wesley Hall

By
Rolland S. Trott  Attorney

March 17, 1931.  C. W. HALL  1,797,062
ROTARY VALVE FOR ENGINES
Filed Oct. 10, 1927   3 Sheets-Sheet 3

Inventor
Charles Wesley Hall
By
Rolland S. Trott  Attorney

Patented Mar. 17, 1931

1,797,062

UNITED STATES PATENT OFFICE

CHARLES WESLEY HALL, OF DENVER, COLORADO, ASSIGNOR TO HALL ROTARY VALVE MOTOR COMPANY, A CORPORATION OF COLORADO

ROTARY VALVE FOR ENGINES

Application filed October 10, 1927. Serial No. 225,266.

My invention relates to internal combustion engines and more especially to four cycle engines in which the events of the cycle are controlled by a rotary member which takes the place of the poppet valves ordinarily used.

Many attempts have been made to provide a satisfactory rotary valve internal combustion engine, but to date no such engine has been evolved which will compare favorably with the best poppet valve engines.

Among the problems of such an engine which have to date remained unsolved are the following:—

The rotary valve must be leak proof whether the engine is hot or cold. In many constructions the fit must be made close when the engine is cold, in order to prevent leakage, and as a result when the expansion or warping due to heat takes place, the fit, at least in spots, becomes too tight causing excessive friction, faulty lubrication, or cutting and scoring of the surfaces.

Should the fit be made just right for a hot engine, then when the engine is cold, the fit is so free as to cause excessive leakage.

This variation of the fit of the valve naturally causes variation in the need for lubrication, and it is difficult to keep the lubrication in perfect step with the change in requirements.

In some designs the distribution of the metal of the rotary valve is such that change of temperature makes uneven expansion and warping a certainty.

In some designs the distribution of metal in the valve is not such as to permit the even and rapid transfer of heat from the portions that are most subject to heat.

All of these problems are related; that is, the valve must at all times be kept leak proof, free from harmful warping and excessively close fits and at all times properly lubricated.

I overcome these problems by providing a rotary valve which properly times the events of the cycle, but which does not alone provide the packing against leakage, the packing function being performed by a special packing ring designed to have resilient packing action in an axial direction as well as radially.

The construction of my rotary valve is clearly shown in the drawings, in which:—

Figure 1:
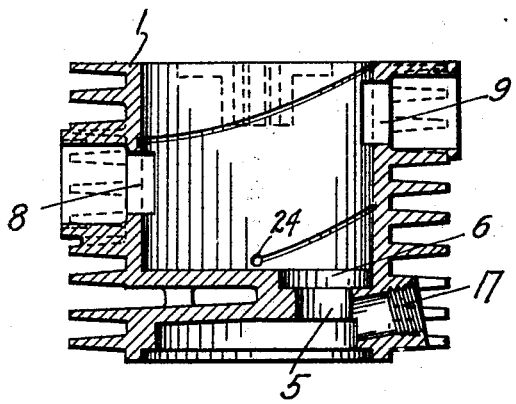
Figure 1 is a sectional view of the rotary valve case.
Figure 2:
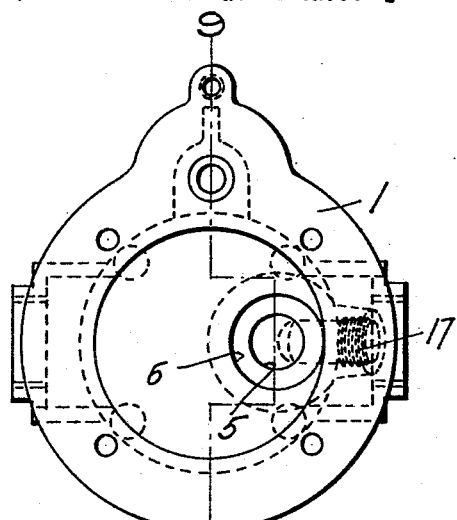
Figure 2 is a plan view of the same.
Figure 3:
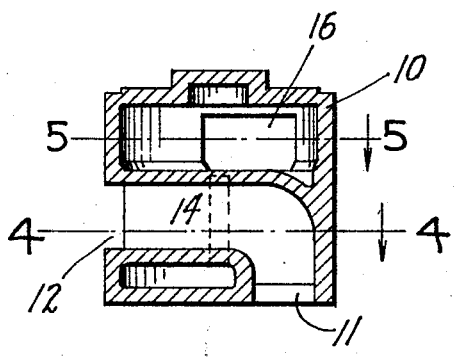
Figure 3 is a section of the rotary valve on the line 3—3 of Figure 4.
Figure 4:
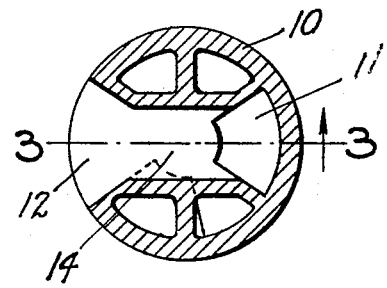
Figure 4 is a section on the line 4—4 of Figure 3.
Figure 5:
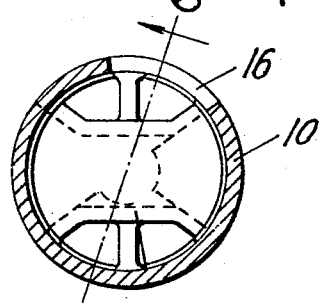
Figure 5 is a section on the line 5—5 of Figure 3.
Figure 8:
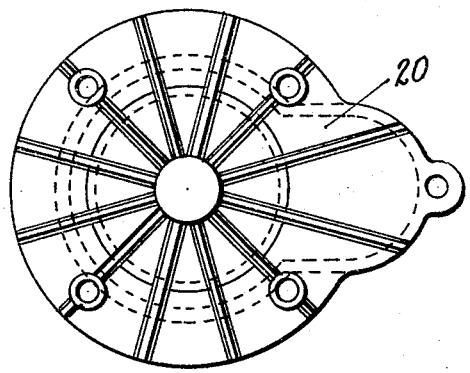
Figure 8 is a plan of the case cover.
Figure 7:
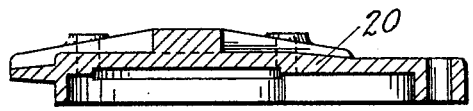
Figure 7 is a section of the case cover.
Figure 6:
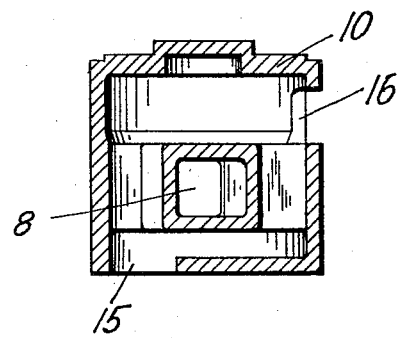
Figure 6 is a section on the line 6—6 of Figure 5.
Figure 9:
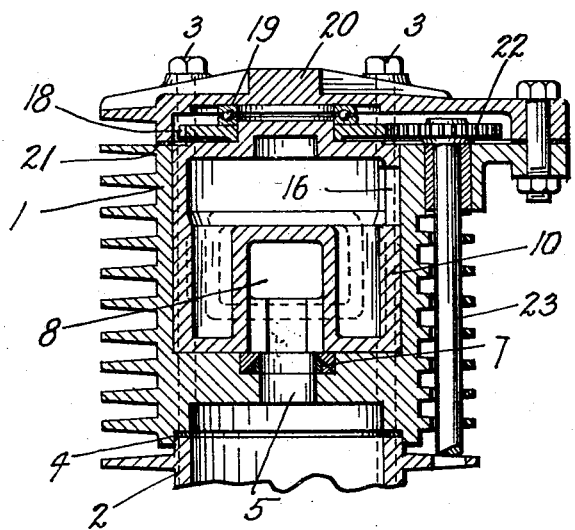
Figure 9 is an assembly view showing the case, valve, cover, and driving gears, as indicated by the line 9—9 of Figure 2.

The rotary valve case 1, bolts to the cylinder 2 by the bolts 3, the joint between the case and cylinder being made tight by the gasket 4.

The case is provided with the port 5 which is provided with the counterbore 6, in which fits the compound expanding packing ring 7. This ring is designed to pack circumferentially like any piston ring, but it also packs laterally as well. This can be seen from the construction shown, but any other type or construction of ring which will pack both circumferentially and laterally may be used if desired.

The case 1 is provided with the exhaust port 8 and the intake port 9.

The rotary valve 10 is provided with the flat exhaust port 11, which is connected to the circumferential exhaust port 12 by the exhaust passage 14.

The rotary valve 10 is also provided with the flat intake port 15 and the circumferential intake port 16, both of which connect with the interior of the rotary valve 10, which forms the passage between them.

The flat ports and the circumferential ports of the rotary valve 10 as well as the exhaust and intake ports of the case 1, are proportioned to provide the proper or desired length of intake, compression, explosion and exhaust in the events of the cycle. With the ports as shown the valve is to be driven at one half the engine speed. An increase in the number of ports will of course result in the necessary decrease in the speed of the valve to bring the events of the cycle.

The flat ports 11 and 15 of the rotary valve 10 register in their turn with the case port 5 surrounded by its packing ring 7.

The circumferential intake port 16 of the rotary valve registers with the intake port 9 of the case 1 but does not register with the exhaust port 8 of the case 1. And the circumferential exhaust port 12 of the rotary valve 10 registers with the exhaust port 8 of the case 1, but does not register with the intake port 9 of the case 1.

The case 1 is provided with the threaded spark plug hole 17, which is to receive a proper spark plug served with a properly timed spark. The position of the spark plug hole may be changed and in fact two or more spark plugs per cylinder may be provided and placed as desired.

An exhaust pipe or manifold is to be connected to the exhaust port 8 of the case 1. A proper intake pipe or manifold leading to a carburetor is to be connected to the intake port 9 of the case 1.

The rotary valve 10 is provided with the driven gear 18 and the ball bearing 19 which contacts against the case cover 20. A plain bearing, a multiple disk bearing or a roller bearing may be employed if desired, its function in any case being to take the end thrust of the rotary valve 10, and position it axially in the case 1.

The bolts 3 hold the cover 20, the case 1, and the cylinder 2 firmly together, the fit between the case 1 and the cover 20 being made tight by the gasket 21.

The gear 18 meshes with the gear 22, which is driven by the shaft 23 from the engine shaft by any proper gearing, so long as the speed of the rotary valve 10 is one half the speed of the engine shaft. This for the construction shown.

In operation, on the intake stroke of the piston, the flat intake port 15 of the rotary valve 10 registers with the port 5 of the case 1, while at the same time the circumferential intake port 16 registers with the intake port 9 of the case 1, establishing a direct passage for the explosive mixture from the carburetor through the intake manifold, through the rotary valve 10 to the cylinder.

Because of the design of the rotary valve 10 this incoming fresh charge of explosive mixture passes about the exhaust passage 14, cooling it, which tends to prevent excessive heat with the resulting chance of warping and faulty lubrication, while at the same time the incoming charge is being heated, which tends toward better action of the engine. Any liquid fuel in the incoming charge will be thrown out against the inner face of the circumferential wall of the rotary valve 10 and will be held there by centrifugal force. The heat of the rotary wall will vaporize this fuel, so that only vaporized fuel can be drawn into the engine cylinder. This is one of the really great advantages of my engine, and I believe helps to explain its steady and perfect operation.

During the compression and the explosion strokes, the leakage is prevented by the seat of the ring 7 against the outer surface of the counterbore of the port 5 and by its flat seat against the lower flat face of the rotary valve 10.

The heat of the explosion which reaches the rotary valve 10 only through the small area of the port 5, is distributed by the thick metal of the lower face of the rotary valve, which heat is also partially carried off by the next incoming fresh cool charge as stated above.

During the exhaust stroke the hot gas passes through the exhaust passage 14, which, as it passes through the center of the rotary valve 10 tends to evenly distribute this heat and minimize the tendency to warp due to uneven heat distribution; the next incoming fresh cool charge also tending to cool, and to be heated by the passage 14, as stated above.

The upward force upon the rotary valve 10 due to the explosion is carried by the ball bearing 19, which is far enough away from the actual heat of the explosion and of the exhaust as to remain comparatively cool.

Oil is to be pumped to the case 1 whose interior surface is provided with spiral oil grooves which miss the exhaust and intake ports, and which by the revolution of the rotary valve 10 act to pump the oil downward along the walls where it is returned through the return oil duct 24 to the oil filter and pump and tank of the oil circulation system. The grooves may be such as to move the oil upward, and the oil may be pumped in at the lower end of the rotary valve and be returned through a connection near the top, if desired. The outer face of the rotary valve may also be covered as thickly as desired with small holes which are adapted to collect oil and make perfect lubrication more certain at all times.

It will be noted that the force of the explosion on the rotary valve 10 is taken by the ball bearing 19 and the packing against leakage from the cylinder is done by the packing ring 7.

So, it is not necessary for the rotary valve 10 to have the usual close fit in the case 1, as required by the ordinary rotary valve of other designs. This provides a margin of safety in my device against the warping from heat that is bound to occur to some slight extent, no matter how carefully the wall thicknesses are proportioned for even and steady distribution of the heat transferred to the rotary valve 10 by the explosion and by the exhaust gas moving through the passage 14.

It will now be seen that I have solved the various problems of the rotary valve as follows:—

The valve is leak-proof either hot or cold, since its fit in the case is not depended upon to prevent leakage, hence the fit may be free enough to prevent excessive tightness or scoring under any condition.

Since the prevention of leakage is due to the action and the spring of the packing ring 7, the variation in the closeness of the fit of the rotary valve 10 in the case 1 has no effect at all upon the leakage of the valve.

Since the exhaust gas passes through the rotary valve 10 almost completely on a diameter, its heat is quite evenly distributed to the valve; and since the incoming cool charge contacts with the entire interior surface of the rotary valve it will naturally carry the most heat from the hottest parts thereof.

Hence the uneven expansion and warping in my valve is cut to a minimum. This, combined with the free fit in the case and the packing by the ring 7 only, together with absorption of all end thrust by the ball bearing 19, makes the lubrication of my valve a simple matter, and the circulation of oil between the rotary valve and the case adds still more to the even cooling and distribution of heat therein. It will be noted that the oil grooves in the wall of the case 1 and the fit of the ring 7 against the bottom flat face of the valve 10 combine to prevent oil leakage and waste, so that a circulating oil system may be employed.

Figure 10:
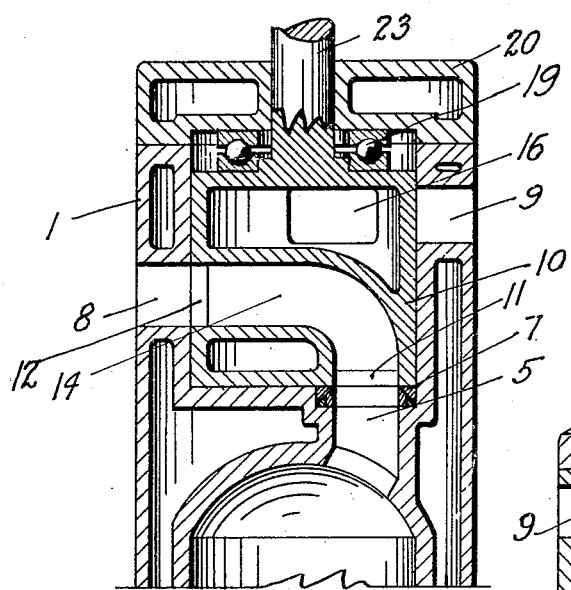
Figure 10 is a view showing a modified form, but without the driving gears.

The modified form shown in Figure 10 shows a construction which may be used in a multicylinder engine and in which the cylinder and the rotary valve case are formed in one piece, and are water jacketed; the drive for the rotary valve being from above, and though not shown, may be by a train of gears joining the rotary valves of the various cylinders and with one upright shaft driven by the engine shaft and proper gearing and geared to one of the rotary valves; or the valves may be driven by an overhead shaft adapted to drive separate rotary valves by separate sets of bevel gears, or by a shaft adapted to drive the separate rotary valves by separate sets of spiral or worm gears. There are various other forms of drive that might be worked out, but as they are such that any intelligent mechanic will perceive, and as they may be varied to suit the conditions imposed by any design of engine, they are not shown in the drawings.

Figure 11:
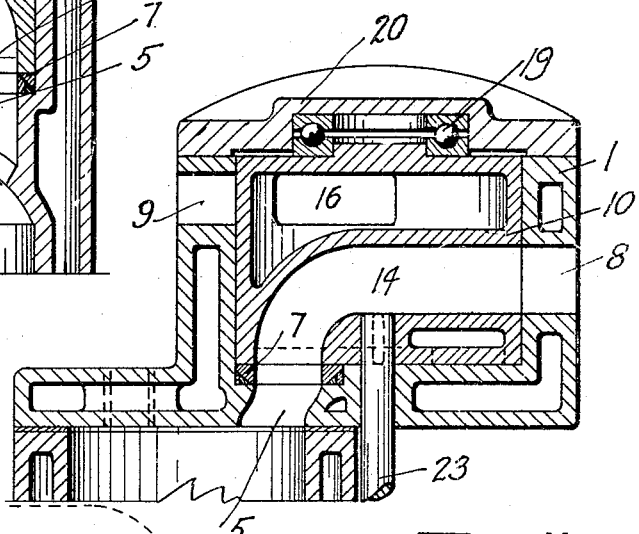
Figure 11 is a view of another modified form.

The modified form shown in Figure 11 shows a construction which might be used as a replacement for the ordinary head and valve mechanism of a water cooled multicylinder engine of the overhead valve type, the ordinary cylinder head, valves, and push rods being discarded in favor of my construction, and the drive for each rotary valve being by an upright shaft, as shown, which may take the place in the crankcase formerly taken by one push rod, and which may be driven by a bevel gear meshing with a bevel gear which takes the place formerly occupied by one of the cams on the cam shaft, or which may be driven by gears in the crankcase of any other suitable kind, type or position.

Figure 12:
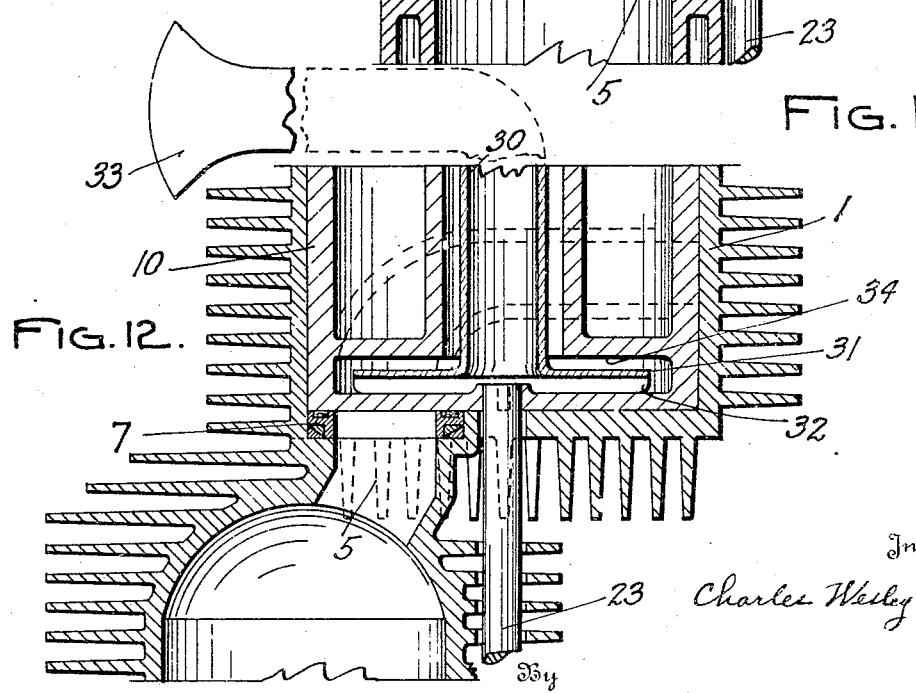
Figure 12 is a view showing another modified form.

In the modified form shown in Figure 12, the construction is adaptable to large air cooled engines, especially such as are used in aeroplanes. The rotary valve is offset from the cylinder so as to give additional cooling surfaces thereunder, and so as to provide a simple and direct drive for each rotary valve, with the driving gears in the crankcase where they will be well lubricated and silent.

This view shows the packing ring of slightly different construction and with an inserted face of different material.

I prefer to use graphite for this material as it is self lubricating to an extent, and will stand heat well; for the reason that the one critical point in my engine is the lower face of the rotary valve; if this face is kept cool and well lubricated the life of any well designed engine equipped with my rotary valve should be very long.

To still further aid in keeping the lower face of the rotary valve cool, and in thereby also aiding in lubrication, I have provided the tube 30 having the flange 31, the flange 31 being provided with the dividing walls 32 extending at right angles thereto.

The funnel 33 is adapted to receive a blast of air (from the propeller or from the movement of the ship if used in an aeroplane) which will be forced down the tube 30 where it will be spread out by the flange 31 and the walls 32, and will thereby be caused to come into contact with the lower face of the rotary valve, and will then pass outward and around the outer edge of the flange 31 and be directed inward again by the inner face 34 of the rotary valve, where it will pass upward around the outside of the tube 30 and out of the valve.

Thus, the blast of air will cool the lower face of the rotary valve from the inside and the cooling fins on the outside of the housing will act to cool the housing and the lower face of the rotary valve from the outside.

It will be seen that my valve can be made to operate successfully with either air or water cooled engines; it will also be noted by anyone versed in the art that two or more cylinder ports may be used and two or more sets of ports in the rotary valve, just so the speed of the valve and the number and proportions of all ports are such as to cause the operation to be in accordance with the four cycle engine requirements.

Obviously any form of thrust bearing may be used for the valve; that is, ball, roller, plain, multiple disk, or even hydraulic, as the type of bearing employed is not limited to any one type, any more than my valve is limited for use to any one size, number, or plan of distribution of cylinders.

Also, it is obvious that any form or kind or construction or material may be used in the packing ring or in the rotary valve or its case, just so each part is successful in performing the duties for which it is designed.

As indicated above, any proper form of drive may be employed for the rotation of the valve or valves, and any number or position of spark plugs may be used as desired.

So, I do not wish to limit myself narrowly to the exact forms and constructions shown, but what I claim as new, and desire to protect by Letters Patent is as follows:—

1. In a valve mechanism for an engine, a cylinder, a case in spaced relation to the cylinder and provided with spaced intake and exhaust ports and means forming a port connecting the case and the cylinder, a cylindrical member adapted to rotate about an axis of rotation in the case and having a cylindrical wall and two end walls and having an intake port in the cylindrical wall connecting with an intake port in one end wall, and an exhaust port in the cylindrical wall axially spaced from the intake port and connecting by a passage with an exhaust port in the end wall, means to rotate the member to bring the intake and the exhaust ports in the end wall to register with the port to the cylinder alternately, and a bearing adjacent the opposite end wall and contacting with the case.

2. In a valve mechanism adapted to control the action of a four cycle internal combustion engine provided with a cylinder having a counterbored port, a case having intake and exhaust ports, a member adapted to be received in the case and having a transverse face adjacent said counterbored port and adapted to rotate in said case and provided with separate intake and exhaust passages adapted to register at one end with the respective intake and exhaust ports of the case and at the other end terminating in separate openings through said transverse face, means to rotate the member to bring said passages to register alternately with the cylinder port, and packing means in the counterbore of the cylinder port resilient both axially and radially, and contacting with said transverse face.

3. In a valve mechanism adapted to control the action of a four cycle internal combustion engine provided with a cylinder, a case having intake and exhaust ports, means forming communication between the case and the cylinder, a member adapted to be received in the case and having a transverse face adjacent said communication means and adapted to rotate in said case and provided with separate intake and exhaust passages adapted to register at one end with the respective intake and exhaust ports of the case and at the other end terminating in separate openings through the said face, means to rotate the member to bring said passages to register alternately with said communication means and means including means radially and axially resilient adapted to have sealing contact with the member and with the case surrounding said communication means.

4. In a valve mechanism, a housing having an end wall provided with a cylinder port having a counterbore, a member having a transverse face and adapted to rotate in the housing with said transverse face adjacent said end wall, said transverse face being provided with separate intake and exhaust ports registering alternately with said cylinder port as the member rotates, and sealing means in said counterbore and bearing against said transverse face.

5. In a valve mechanism, a housing having an end wall provided with a cylinder port having a counterbore, a member having a transverse face and adapted to rotate in the housing with said transverse face adjacent said end wall, said transverse face being provided with separate intake and exhaust ports registering alternately with said cylinder port as the member rotates, sealing means both radially and axially resilient in said counterbore and bearing against said transverse face, and means adapted to prevent movement of said member away from said end wall and carried by said housing.

6. In a valve mechanism, a housing having an end wall provided with a cylinder port having a counterbore, a member having a transverse face and adapted to rotate in the housing with said transverse face adjacent said end wall, said transverse face being provided with separate intake and exhaust ports registering alternately with said cylinder port as the member rotates, said member having a free fit in the housing, sealing means in said counterbore and bearing against said transverse face, and means adapted to prevent movement of said member away from said end wall and carried by said housing.

7. In a valve mechanism, a housing having an end wall provided with an eccentric cylinder port having a counterbore, a member having a transverse face and adapted to rotate in the housing with said transverse face adjacent said end wall, said transverse face being provided with intake and exhaust ports registering alternately with said cylinder port as the member rotates, and sealing means both radially and axially resilient in said counterbore and bearing against said transverse face, whereby the rotation of the member and its contact with the eccentrically positioned sealing means will cause said sealing means to slowly rotate in said counter bore.

8. In a valve mechanism for an engine having a cylinder, a case adapted to receive a cylindrical member provided with intake and exhaust ports in different zones, means forming communication between the case and the cylinder, a cylindrical member having a transverse face provided with separate intake and exhaust ports and with separate intake and exhaust passages connected therewith respectively and adapted to rotate in the said case to cause said passages to register with the respective intake and exhaust ports of the case and to connect alternately with the cylinder through said communication means, and means to rotate said member.

9. In a valve mechanism for an engine having a cylinder, a case adapted to receive a cylindrical member provided with intake and exhaust and cylinder ports in different zones, a cylindrical member having separate intake and exhaust passages and adapted to be received by the said case and having a transverse face provided with separate intake and exhaust ports communicating respectively with the passages of the member, and means to rotate the member to bring the intake and exhaust ports and passages to register alternately with the cylinder, intake and exhaust ports of the case respectively.

10. In a valve mechanism for an engine having a cylinder, a case adapted to receive a cylindrical member in communication therewith and provided with intake and exhaust ports in different zones, a cylindrical member adapted to rotate in the case and provided with separate intake and exhaust passages adapted to communicate intermittently with the cylinder at one end and with the intake and exhaust ports of the case respectively at the other end, the end of the member adjacent the cylinder being provided with a transverse face having separate exhaust and intake ports therethrough in communication with the exhaust and intake passages respectively, and means to rotate the member in said case.

11. In a valve mechanism for an engine, a cylinder, a case adapted to receive a cylindrical member adjacent thereto, means providing communication between the case and the cylinder, the case provided with intake and exhaust ports in different zones, a cylindrical member adapted to rotate in the case and provided with separate intake and exhaust passages, the end of the member adjacent the cylinder being provided with a transverse face having separate exhaust and intake ports therethrough in communication with said exhaust and intake passages respectively, means to rotate the member and cause its intake passage to register with said communication means and said intake port, and its exhaust passage to register with the said communication means and the exhaust port alternately.

12. In a valve mechanism for an engine, a cylinder, a case adapted to receive a cylindrical member adjacent thereto, means providing communication between the case and the cylinder, the case provided with intake and exhaust ports in different zones, a cylindrical member adapted to rotate in the case and provided with separate intake and exhaust passages, the end of the member adjacent the cylinder being provided with a transverse face having separate exhaust and intake ports therethrough in communication with the intake and exhaust passages respectively, and means to rotate the member whereby said communication means will be connected alternately to said ports respectively through the passages of the member.

13. In a valve mechanism adapted to control the action of a four cycle internal combustion engine provided with a cylinder, a case adapted to receive a cylindrical member having intake and exhaust passages in different zones, means forming communication between the case and the cylinder, a cylindrical member adapted to rotate in said case and provided with separate intake and exhaust passages adapted to register with the respective intake and exhaust passages of the case, and with the communication means, the end of the member adjacent the cylinder being provided with a transverse face having separate ports connecting with said passages through the member, means to rotate the member to bring the said ports to register alternately with said communication means, packing means contacting the case and the member and adapted to prevent leakage between them from said communication means, and bearing means adapted to position the said member axially and supported by the case.

14. In a valve mechanism for an engine having a cylinder, a case adapted to receive a cylindrical member adjacent thereto provided with separate intake, exhaust and cylinder ports, a member having a transverse packing face adapted to rotate in the case and provided with separate intake and exhaust passages terminating at one end in said transverse face and adapted to register alternately with said exhaust and intake ports respectively, packing means concentric with said cylinder port and contacting the case and the transverse face of the member and adapted to prevent leakage between the case and the member from the cylinder port and bearing means adapted to position the said member axially by contact with the case and the member, and means to rotate the member.

15. In a valve mechanism for an engine having a cylinder, a case adapted to receive a cylindrical member in communication therewith through a port and provided with separate intake and exhaust ports, a cylindrical member having a transverse face adjacent said communication port adapted to rotate in the case and provided with separate intake and exhaust passages adapted to communicate intermittently with the cylinder through said communication port at one end and with the intake and exhaust ports of the case respectively at the other end, means to rotate the member, and means adapted to position the member axially by contact with the member and the case.

16. In a valve mechanism, a housing having an end wall provided with a cylinder port having a counterbore and with separate intake and exhaust ports, a cylindrical member having a transverse face and adapted to rotate in the housing with said transverse face adjacent said end wall, said transverse face being provided with separate intake and exhaust ports registering alternately with said cylinder port and with said intake and exhaust ports respectively as the member rotates, and sealing means in said counterbore and bearing against said transverse face.

17. In a valve mechanism, a housing having an end wall provided with a cylinder port having a counterbore and with separate intake and exhaust ports, a cylindrical member having a transverse face and adapted to rotate in the housing with said transverse face adjacent the said end wall, said transverse face being provided with separate intake and exhaust ports registering alternately with said cylinder port and said intake and exhaust ports as the member rotates, sealing means both radially and axially resilient in said counterbore and bearing against said transverse face, and means adapted to prevent movement of said member away from said end wall and carried by said housing.

18. In a valve mechanism for an engine having a cylinder or other working chamber, a case adjacent the cylinder and provided with spaced intake and exhaust ports, an end wall and means connecting the case in communication with the cylinder, a rotary member having side walls and end walls and having an intake port in the end wall adjacent the end wall of the case communicating with an intake port in said side walls, and an exhaust port in said side walls axially spaced from said intake port and communicating with an exhaust port in said end wall spaced from said intake port, means to rotate the member to bring the intake and exhaust ports in its end wall to register in sequence with said communication means, and a bearing contacting the opposite end wall and the case.

19. In a valve mechanism for an engine having a cylinder or other working chamber, a case adjacent the cylinder and provided with a port, an end wall, and means connecting the case in communication with the cylinder, a rotary member having side walls and end walls and having a port in the end wall adjacent the end wall of the case communicating with a port in said side walls, means to rotate the member to bring the port in its end wall to register with said communication means and the port in its side walls with the port of said case, and a bearing contacting the opposite end wall and the case.

In testimony whereof I affix my signature.

CHARLES WESLEY HALL.